(12) United States Patent
Kondziela (10) Patent No.: US 8,909,538 B2
(45) Date of Patent: *Dec. 9, 2014

(54) ENHANCED INTERFACE FOR USE WITH SPEECH RECOGNITION

(71) Applicant: Verizon Services Corp., Arlington, VA (US)

(72) Inventor: James Mark Kondziela, Stamford, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,776

(22) Filed: Nov. 11, 2013

(65) Prior Publication Data

US 2014/0142952 A1    May 22, 2014

Related U.S. Application Data

(63) Continuation of application No. 10/755,502, filed on Jan. 12, 2004, now Pat. No. 8,583,439.

(51) Int. Cl.
*G10L 21/00* (2013.01)
*G10L 15/22* (2006.01)
*G10L 21/16* (2013.01)
*G10L 13/033* (2013.01)

(52) U.S. Cl.
CPC .............. *G10L 21/16* (2013.01); *G10L 13/033* (2013.01); *G10L 15/22* (2013.01)
USPC ........... 704/275; 704/271; 704/270; 704/268; 704/267; 704/260; 704/258; 704/257; 704/256; 704/253; 704/241; 704/200; 381/94.3; 379/88.23; 379/189

(58) Field of Classification Search
USPC ......... 704/258, 260, 270, 275, 200, 257, 241, 704/271, 268, 267, 256, 253; 381/94.3; 379/88.23, 189
See application file for complete search history.

(56) References Cited

U.S. PATENT DOCUMENTS 5,357,596 A * 10/1994 Takebayashi et al. ......... 704/275
5,715,368 A *  2/1998 Saito et al. .................... 704/268
5,749,071 A *  5/1998 Silverman ..................... 704/260
5,799,275 A *  8/1998 Itoh et al. ...................... 704/241

(Continued)

OTHER PUBLICATIONS

Carpenter, "Wait, Don't Tell Me!" Monitor on Psychology, vol. 34, No. 10, pp. 15-21 (part of the Science Watch series), Nov. 2000.

(Continued)

*Primary Examiner* — Michael Colucci (57) ABSTRACT

Improved methods of presenting speech prompts to a user as part of an automated system that employs speech recognition or other voice input are described. The invention improves the user interface by providing in combination with at least one user prompt seeking a voice response, an enhanced user keyword prompt intended to facilitate the user selecting a keyword to speak in response to the user prompt. The enhanced keyword prompts may be the same words as those a user can speak as a reply to the user prompt but presented using a different audio presentation method, e.g., speech rate, audio level, or speaker voice, than used for the user prompt. In some cases, the user keyword prompts are different words from the expected user response keywords, or portions of words, e.g., truncated versions of keywords.

20 Claims, 7 Drawing Sheets

(56) References Cited

U.S. PATENT DOCUMENTS

| | | | |
|---|---|---|---|
| 5,860,062 A * | 1/1999 | Taniguchi et al. | 704/256 |
| 5,890,115 A * | 3/1999 | Cole | 704/258 |
| 6,104,786 A * | 8/2000 | Gibilisco et al. | 379/88.23 |
| 6,144,938 A * | 11/2000 | Surace et al. | 704/257 |
| 6,151,575 A * | 11/2000 | Newman et al. | 704/260 |
| 6,178,404 B1 * | 1/2001 | Hambleton et al. | 704/275 |
| 6,202,049 B1 * | 3/2001 | Kibre et al. | 704/267 |
| 6,321,197 B1 * | 11/2001 | Kushner et al. | 704/270 |
| 6,584,440 B2 * | 6/2003 | Litovsky | 704/271 |
| 6,757,395 B1 * | 6/2004 | Fang et al. | 381/94.3 |
| 7,194,409 B2 * | 3/2007 | Balentine et al. | 704/253 |
| 7,243,060 B2 * | 7/2007 | Atlas et al. | 704/200 |
| 7,698,136 B1 * | 4/2010 | Nguyen et al. | 704/241 |
| 2002/0021791 A1 * | 2/2002 | Heilmann et al. | 379/189 |
| 2002/0035474 A1 * | 3/2002 | Alpdemir | 704/270 |
| 2003/0229497 A1 * | 12/2003 | Wilson et al. | 704/270.1 |

OTHER PUBLICATIONS

Christensen, "Theory Proposed for 'Tip of the Tongue' Phenomenon," pp. 13-14, Aug. 8, 2003.

Zoltan-Ford, "How to Get People to Say and Type What Computers Can Understand," Department of Psychology, Towson State University, International Journal of Man-Machine Studies, vol. 34, pp. 527-547, Aug. 9, 1988.

* cited by examiner

ENHANCED INTERFACE FOR USE WITH SPEECH RECOGNITION

RELATED APPLICATIONS

The present application is a continuation of allowed U.S. patent application Ser. No. 10/755,502 which was filed on Jan. 12, 2004 and which is hereby expressly incorporated by reference in its entirety.

FIELD OF THE INVENTION

The present invention relates generally to the field of user interfaces, and more particularly, to the field of user interfaces in automated systems employing voice prompts and speech recognition.

BACKGROUND

In automated systems, user interfaces, employing speech recognition, often have a limited vocabulary of recognizable words. These speech recognition interfaces, in many cases, are designed under the assumption that a user will pronounce a specific word or set of words (keywords) which are expected to be used to trigger an action, e.g., move to the next prompt, provide a specific service, or transfer to an operator. To increase the likelihood that the user will respond to a prompt using one of the expected words, keywords are sometimes presented to the user in the hope that the user will respond by saying one of the keywords. Known current interface practices include: (1) providing the user with an initial list of recognizable response keywords at the end of an initial prompt, (2) waiting for the user to fail to respond to an initial prompt for a specific interval of time and then provide a list of recognizable response keywords, or (3) waiting for the user to make an error, e.g., pronounce a word not included in the set of anticipated recognizable response keywords and then provide a list of recognizable response keywords. When method (1) is employed, the automated speech interface normally presents the keywords slowly, clearly, and distinctly. In such a case, a user may become annoyed while impatiently waiting for the keyword message to end. With the approach (2), the user interface, by waiting for the user to fail to respond before proceeding, is waiting for the user to become confused, again resulting in an unsatisfied user. Approach (3) waits for the user to make an error and then responds, at which point the user may be frustrated.

All of these known methods have a tendency to cause user agitation and often result in dissatisfaction with automated speech recognition user interfaces. Dissatisfaction may result in a user hanging up on the automated system or being in a general state of agitation when executing a transaction and/or when ultimately coupled to a human operator. A resulting intentional disconnection by an annoyed user may result in the loss of business or the loss of a customer to a competitor. Placing the user in a general state of agitation may make the user less likely to be persuaded to make a purchase or sign up for a contract or service. For systems using voice recognition for customer service, starting off by agitating the customer will generally result in a more argumentative customer and make it more difficult for the customer service representative to reach a reasonable settlement with the customer.

While dissatisfaction may occur when speech interfaces are used, the cost savings made possible by such systems remain a motivating factor. Speech recognition user interfaces may result in significant cost savings over direct human operators. Therefore, companies have an incentive to maximize usage of automated voice user interfaces wherever possible. One of the limiting factors on the use of automated voice interfaces is the negative effect on business resulting from the minor annoyances (as previously described) inherent in existing interactive automated voice interfaces. Based upon the above discussion, there is significant room for, and a need for, improvements in the usability of existing automated speech recognition user interfaces.

Several empirical findings in human perceptual research relevant to the invention shall now be discussed.

(1) In a widely observed type of forgetting, known as "tip-of-the-tongue" phenomena (the nagging feeling of knowing a name or word but not being able to retrieve it), phonological cues are known to aid retrieval.

(2) A kind of selective attention, known as the "cocktail party" effect, exists and has been observed in natural and laboratory settings. This "cocktail party" effect describes the human ability to focus one's listening attention on a single talker among a cacophony of conversations and background noise.

(3) Research has demonstrated that the probability of a listener correctly hearing a word varies with the word occurring in a particular context. For example, after hearing the word "bread", the subsequent occurrence of "butter" or "knife" is more likely than "eraser" or carburetor".

(4) Perceptual research has demonstrated that even very rapidly presented (subthreshold) stimuli, e.g., a 28-msec visual presentation of a word such as "canary", can accelerate and facilitate subsequent perception of related stimuli, e.g., more rapid perception of the word "parrot".

In view of the above problems with existing speech user interfaces it can be appreciated that there is a need for improved speech interfaces. For increased levels of user satisfaction any improved interface should address at least some of the problems with existing interface techniques and, optionally, take advantage of one or more characteristics of human perception discussed above.

SUMMARY OF THE INVENTION

The invention is directed to methods and apparatus for improving the usability of the user interfaces of automated systems (e.g., phone based, PC based, etc.) that employ speech recognition or other voice input, e.g., in conjunction with menus or prompts. An automated speech recognition user interface that is employed as part of a system of the present invention responds to voice response keywords, spoken alone or in the context of other speech. The method of the invention improves the user interface by presenting, in addition to a user prompt, a keyword prompt that is presented using one or more novel presentation methods of the present invention. The enhanced, e.g., processed, keyword prompts of the present invention facilitate a user selecting an appropriate response to a menu item but are less likely to annoy a customer because of the novel way in which the keyword prompt is presented to the user. The processed (enhanced) user keyword prompts may be digitally enhanced versions of user keyword prompts that have been processed to modify their presentation format and/or content. In some embodiments, the user keyword prompts may be the same words as the user voice response keywords. In other embodiments the user keyword prompts may be different words from the user voice response keywords, e.g., truncated versions of keywords, which can be used to trigger the user to remember and annunciate the user voice response keywords that are expected in response to the user prompt.

Various types of enhancements may, and often are, applied to user keyword prompts in accordance with the invention to make them less annoying to a user. One type of enhancement is accelerating the speed of the presentation of the user keyword prompts. This represents a reduction, in terms of presentation time, of the keyword prompt. Various techniques may be used to accomplish the speed enhancement including compression, fast talking by the recording artist, or high speech rate settings on a speech synthesizer. This speed enhancement could avoid presenting the user with a lengthy annoying prompt. In some embodiments, the speech enhancement may be increased to a level where the user may not be able to repeat each of the words, but the user would still be affected by a (subthreshold) stimuli increasing the user's likelihood to remember and pronounce the correct user voice response keyword. Another or alternative enhancement may include the truncation of words thus shortening the interval that the user must listen to the prompt. It may not be necessary to fully annunciate a word to trigger word recognition by a user. Thus the presentation of truncated words instead of fully pronounced words may achieve the same or almost the same level of successful response from a user, but with the benefit of a shorter prompt time. A third technique for enhancement is recording different keyword prompts in different voices, e.g., using different recording artists. In some embodiments, the voices may be human voices, while in other embodiments the voices may be machine generated synthesized voices. Various combinations of human and machine synthesized voices are also possible in accordance with the invention. In addition, in some embodiments, different volume levels could also be applied to each of the different user keyword prompts. The distinction in voices may aid the user in differentiating between the different keywords. A fourth type of enhancement may include mixing together two or more user keyword prompts so as to present them partially or fully overlapped. Typically, this enhancement would be performed in conjunction with using different voices for different keyword prompts. This combination would directly exploit the "cocktail party effect", in which a user can focus his attention on the one word of interest and treat the other voices as background noise. A fifth type of enhancement may include reducing the overall volume level (gain or amplitude) of the user keyword prompts relative to the user prompt. This feature of overall volume level reduction would generally be performed in conjunction with any of the other enhancements which were applied to user keyword prompts.

Some features of the enhancements such as increasing the speed of the user keyword prompts, truncating keyword prompts or mixing keyword prompts may by themselves, if communicated at the typical bold prompt volume level, be annoying to the user; however, if the volume level was set at a low level the user annoyance could be negated. Thus volume level reduction is a useful feature of the invention with regard to keyword prompt presentation methods.

In some embodiments, the generation of the processed (enhanced) keyword prompts may be performed prior to menu generation, stored, and replayed during menu presentation. In other embodiments, voice keyword prompts may be recorded, and stored prior to menu presentation; however, processing into processed (enhanced) keyword prompts may be performed during menu presentation. In still other embodiments, pre-recorded voice keyword prompts may not exist, and the processed (enhanced) keyword prompts are generated and played during the menu presentation, e.g., by a speech synthesizer based on keyword prompt information and/or menu presentation information.

In some embodiments, the processed (enhanced) keyword prompts may overlap either partially or fully the user prompt to which the processed (enhanced) keyword prompt is being appended. In applications where a user frequently utilizes the same user prompt, generally the user need not devote full attention to the entirety of that prompt. Under such conditions, processed (enhanced) keyword prompts may overlap the user prompt, in accordance with the invention.

Benefits of the invention may include improvements in speech recognition accuracy rates, reduced transaction time, and a higher level of satisfaction of the user resulting in better customer retention and/or increased sales.

Numerous additional features and benefits of the methods and apparatus of the present invention are discussed below in the detailed description which follows.

BRIEF DESCRIPTION OF THE FIGURES

FIG. 3, which comprises the combination of FIGS. 3A and 3B, is a flowchart illustrating an exemplary method of enhanced voice prompt information generation in accordance with the present invention.

DETAILED DESCRIPTION

Figure 1:
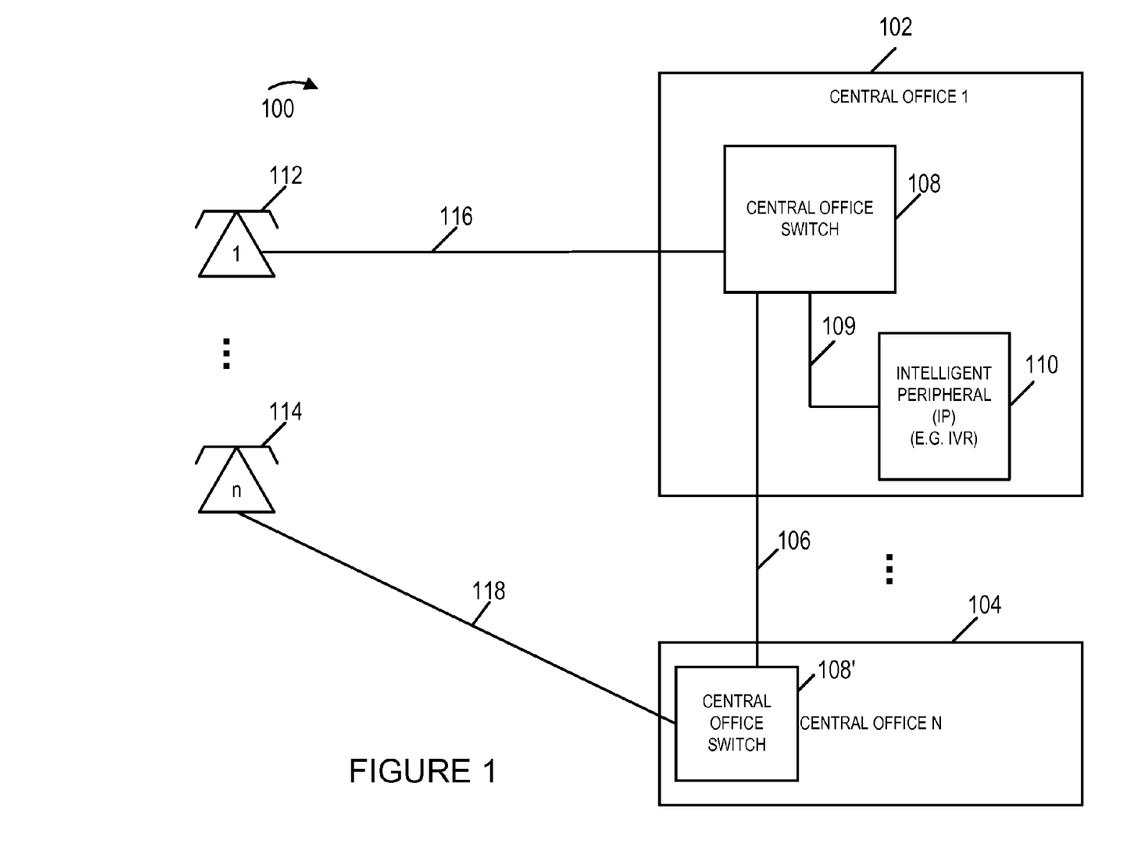
FIG. 1 is an exemplary automated system employing speech recognition and using enhanced voice prompts in accordance with the methods of the present invention.

FIG. 1 illustrates an exemplary automated system 100 employing speech recognition and using enhanced voice prompts in accordance with the methods of the present invention. The enhanced voice prompts include a combination of a user prompt and a keyword prompt with the keyword prompt being provided using one of the presentation techniques of the invention. This often results in a user prompt presented using convention speech and a keyword prompt presented using the various presentation methods of the invention. Automated system 100 includes a plurality of central offices: central office 1 102, central office N 104. Each central office 102, 104 includes a central office switch 108, 108', respectively. The central office switches 108, 108' are coupled together via network link 106. Network link 106 may be, e.g., a fiber optic cable. Automated system 100 also includes at least one intelligent peripheral (IP) device 110. In system 100, IP device 110 is an Intelligent Voice Response (IVR) device, implemented in accordance with the present invention, and is located in central office 1 102. IP device 110 is coupled to central office switch 108 via network link 109. Automated system 100 also includes a plurality of user communication devices, e.g., telephone 1 112, telephone n 114. User communication device 1 112 is coupled to central office switch 108 via link 116, while user communication device n 114 is coupled to central office switch 108' via link 118. Links 116, 118 may be, e.g., twisted pair wires or DSL lines.

A user, e.g., a user of telephone n 114, may initiate a call, which may be routed through central office n 104, to central office 1 102, where a connection is established to IP device 110. IP device 110 may, in response to the call, initiate a menu presentation, in accordance with the present invention. IP device 110 may include a voice interface capable of: (i) generating and/or playing user prompts, (ii) generating and/or playing enhanced user keyword prompts, and (iii) recognizing and responding to response keywords.

Figure 2:
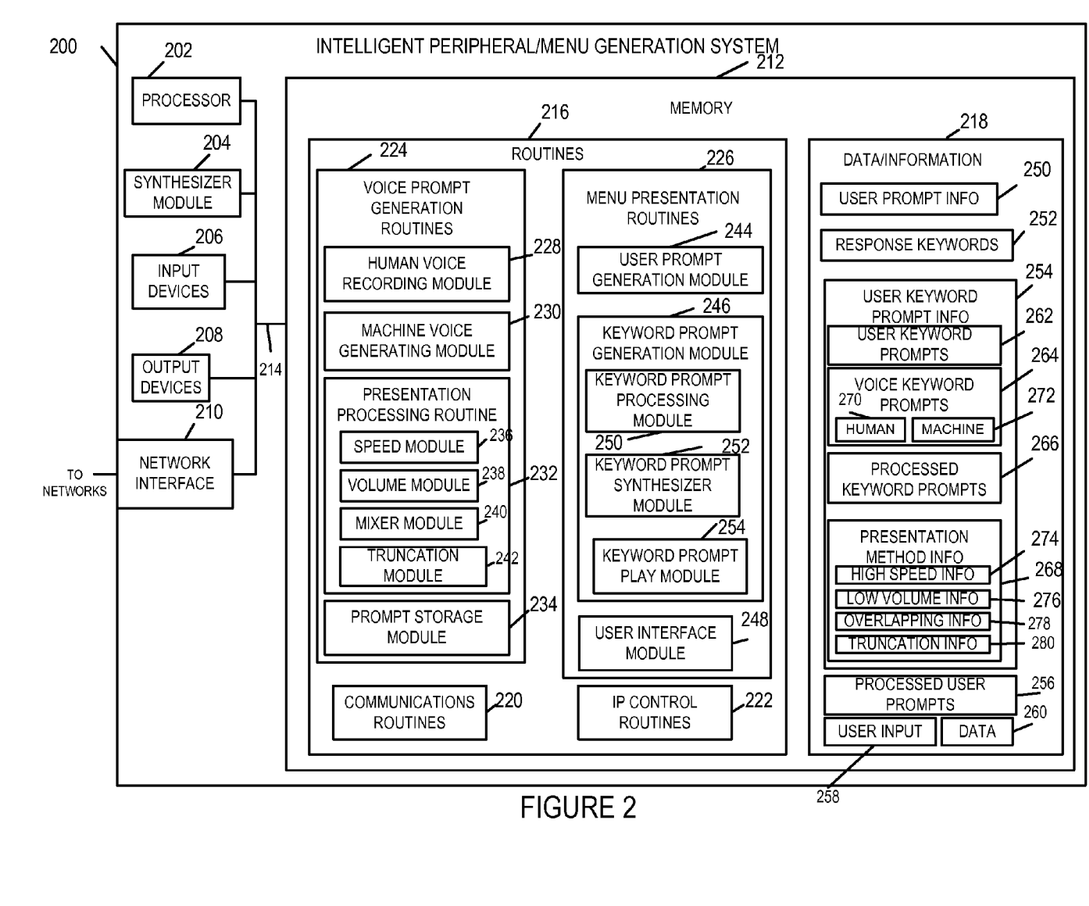
FIG. 2 is an exemplary Intelligent Peripheral (IP)/Menu Generation system implemented in accordance with the present invention.

FIG. 2 illustrates an exemplary Intelligent Peripheral/Menu Generation System 200 implemented in accordance with the present invention. IP/Menu Generation System 200 may be used as IP (IVR) device 110 in system 100 of FIG. 1. IP/Menu Generation system 200 includes a processor 202, a synthesizer module 204, input devices 206, output devices 208, a network interface 210 and memory 212 coupled together via bus 214 over which the various elements may interchange data and information.

Memory 212 includes routines 216 and data/information 218. Routines 216 may include communications routines 220, IP control routines 222, voice prompt generation routines 224, and menu presentation routines 226. Data/Information 218 may include user prompt information 250, response keywords 252, user keyword prompt information 254, processed user prompts 256, user input 258, and data 260.

Processor 202, e.g., a CPU, may execute the routines 216 and use the data/information 218 in memory 212 to perform basic IP/Menu Generation functional operations and implement the methods of the present invention, e.g., establish communications with a user, interact with the user via an automated voice interface including enhanced user keyword prompts. Synthesizer module 204, e.g., a standard commercial speech synthesizer card, may generate user prompts and/or enhanced keyword prompts in accordance with the presentation methods of the present invention.

Input devices 206 may include microphones, recording devices, and digital storage devices. In some embodiments, human voices pronouncing user keyword prompts shall be input via input device 206. In other embodiments, the individual(s) may be located at a remote site and human voice(s) may be input through network interface 210. In other embodiments, human voices may have been recorded and/or stored at a remote location, and the digital information corresponding to the voice(s) may be transferred to IP/Menu Generation system 200 via input device 206 and/or network interface 210. Output devices 208 may include speakers, monitors, displays, printers, spectrum analyzers, FFT analyzers, etc. and may display the electronic signature of user keyword prompts and enhanced user keyword prompts. Network interface 210 may provide an interface from the IP/Menu Generation system 200 to the central office switch and may couple the IP/Menu Generation system 200 to other elements within a communications system and to a plurality of users who may use the enhanced voice interface.

User prompt information 250 may include user prompts, rates of speech associated with the user prompts, and volume or amplitude levels associated with the user prompts. Each user prompt may be, e.g., a first set words presented to a user by the voice interface as part of an automated menu. In some embodiments, the user may be located locally, e.g., at the site of IP/Menu Generation System 200, while in other embodiments, the user may be located at a remote site and may access the system via, e.g., a phone or Internet interface.

Response keywords 252 may include a set of words that the IP/menu generation system 200 may recognize as acceptable voice responses by a user to a user prompt. The response keywords 252 are a set of words that will satisfy the corresponding user prompt.

User keyword prompt information 254 may include user keyword prompts 262, voice keyword prompts 264, processed keyword prompts 266, and presentation method information 268. User keyword prompts 262 are a set of words chosen to be presented with the corresponding user prompt. User keyword prompts 262 may be the same set of words as the response keywords 252. User keywords prompts 262 may also include words, portions of words, or phrases, other than the response keywords 252, chosen to act as a stimuli, trigger an association, or provide a phonological cue to a user to make the user aware of a response keyword. In some embodiments, some of the user keyword prompts 262 may be identical to some of the response keywords 252, while other user keyword prompts 262 may be different.

Voice keyword prompts 264 include human generated voice keyword prompts 270 and machine generated voice keyword prompts 272. Human generated voice keyword prompts 270 may include digital recording of the pronunciation of each user keyword prompt 262, in which the digital recording was obtained by recording a human voice. In some embodiments, a different recording artist may be used for each or some of the individual human generated voice keyword prompts 270. Machine generated voice keyword prompts 272 may include digital files of each of the user keyword prompts 262, generated by a machine, e.g., synthesizer module 204. Processed keywords prompts 266 may include voice keyword prompts 264 which have been processed, in accordance with the invention, according to the selected presentation method.

The presentation method info 268 includes high speed info 274, low volume info 276, overlapping info 278, and truncation info 280. Presentation method information 268 may include information identifying the type(s) of presentation method that should be applied to each of the voice keyword prompts 264 to generate a processed keyword prompt 266. High speed information 274 may include information defining a compression/expansion special audio effect that may be applied to the voice keyword prompt 264 to output a different rate of speech, e.g., faster, than the rate used for the corresponding user prompt. Low volume information 276 may include information defining an amplitude or gain adjustment, e.g., reduction, that may be applied to each voice keyword prompt 264 to output a different volume level, e.g., lower, than the volume level used for the corresponding user prompt. In some embodiments, different volume levels may be applied to different keyword prompts within the same set of keyword prompts, e.g., a different volume level for one of a plurality of words presented using different voices. In some embodiments, the volume level on individual voice keyword prompts may be varied during the presentation, e.g., volume fading may and is used in some embodiments. Overlapping information 278 includes information defining mixture(s) of 2 or more voice keyword prompts 264 in a set so that some or each of the processed keyword prompts 266 in a set are presented partially or fully overlapping. Overlapping information 278 may include information defining the voice keyword prompts 264 to be overlapped and the portions of the voice keywords prompts 264 to be overlapped. Truncation information 280 includes information defining portions of voice keyword prompts 264 that are to be eliminated during the processing used to generate the processed keyword prompts 266. A processed user prompt 256 is, in many cases, an audio version of the user prompt generated from stored user prompt information 250.

User input 258 includes information, e.g., processed audio corresponding to received speed, representing user responses to user and keyword prompts. The user input 258 includes, e.g., voice responses by a user to a menu presentation including a user prompt 256 and processed (enhanced) keyword prompts 266. Such voice responses by a user may include the pronunciation of response keywords 252 and the pronunciation of words not included in the set of recognized response keywords 252. Data 260 may include intermediate processing data generated by the synthesizer, intermediate processing data generated by the presentation processing routine 232, and statistical success/failure rates corresponding to the current implementation of the processed (enhanced) keyword prompts 266. Such statistical information may be utilized, in some embodiments, to adjust the presentation methods to attempt to maximize success rates and/or minimize menu access time. Statistical success/failure information may also be used to adjust or customize the presentation for a specific user or set of users.

Communication routines 220 may implement the various communications protocols used by the intelligent peripheral/menu generation system 200. IP control routines 222 may direct the basic functional operations of the IP/menu generation system 200 including control of the input devices 206, control of the output devices 208, control of the network interface 210, and/or establishment and/or termination of connections with users.

Voice prompt generation routines 224 include a human voice recording module 228, a machine voice generating module 230, a presentation processing routine 232, and a prompt storage module 234.

Human voice recording module records human speech pronunciations of user keyword prompts 262 via an input device 206, e.g., a microphone, and outputs human voice keyword prompts 270. Machine voice generating module 230 inputs each user keyword prompt 262, controls generation of a machine based keyword prompt 272 for each input (using synthesizer module 204), and outputs a digital file for each individual machine based user keyword prompt 272.

Presentation processing routine 232 includes a commercially available or proprietary voice sound, and/or music editing software package, e.g., Sound Forge by Sonic Foundry. Presentation processing routine 232 can be used in conjunction with synthesizer module 204 or can be operated independently. Presentation processing routine 232 includes a speed module 236, a volume module 238, a mixer module 240, and a truncation module 242. The presentation processing routine 232 processes user keyword prompts 262, voice keyword prompts 264, and/or partially processed keyword prompts according to the selected presentation method specified in the presentation method info 268. In some embodiments, the presentation processing routine 232 is evoked during menu generation prior to interaction with a user. In other embodiments, the presentation processing routine 232 is evoked during presentation of a menu to a user to process voice keyword prompts 264 to processed keyword prompts 266. Speed module 236 uses the high speed presentation information 274 to perform processing. Volume module 238 uses the low volume presentation information 276 to perform processing. Mixer module 240 uses the overlapping presentation information 278 to perform processing. Truncation module 242 uses the truncation presentation information 280 to perform processing. Prompt storage module 234 stores user prompt info 250 along with a set of user keyword prompt information 254. The stored sets of user keyword prompt information 254 may include processed keyword prompts 266, user keyword prompts 262 plus presentation method information 268, and/or voice keyword prompts 264 plus presentation method information 268.

Menu presentation routines 226 include a user prompt generation module 244, a keyword prompt generation module 246, and a user interface module 248. User prompt generation module 244 generates a processed user prompt 256, which is an audio version of the user prompt derived from stored user prompt information 250.

Keyword prompt generation module 246 includes a keyword prompt processing module 250, a keyword prompt synthesizer module 252, and a keyword prompt play module 254. In some embodiments of the invention, keyword prompt processing module 250 processes (during presentation of a menu to a user) pre-recorded keyword prompts 264 according to the selected presentation method indicated in presentation method info 268, generating an audio format output of processed keyword prompts 266. In other embodiment of the invention, the keyword prompt synthesizer module 252 synthesizes user keyword prompts 262 (during presentation of a menu to a user) in accordance with the presentation method information 268, and outputs audio format processed keyword prompts 266. Keyword prompt synthesizer module 252 operates in conjunction with synthesizer module 204. Keyword prompt play module 254 generates and sends signals to the user to allow the user to hear the processed keyword prompts 266.

User interface module 248 initiates menu presentation to a user, generates and sends signals to a user, allowing the user to play and hear the processed user prompt 256. User interface module 248 may control the timing between the processed user prompt 256 and the corresponding processed (enhanced) keyword prompts 266, monitors for user input 258, and responds to received user input 258.

Figure 3A:
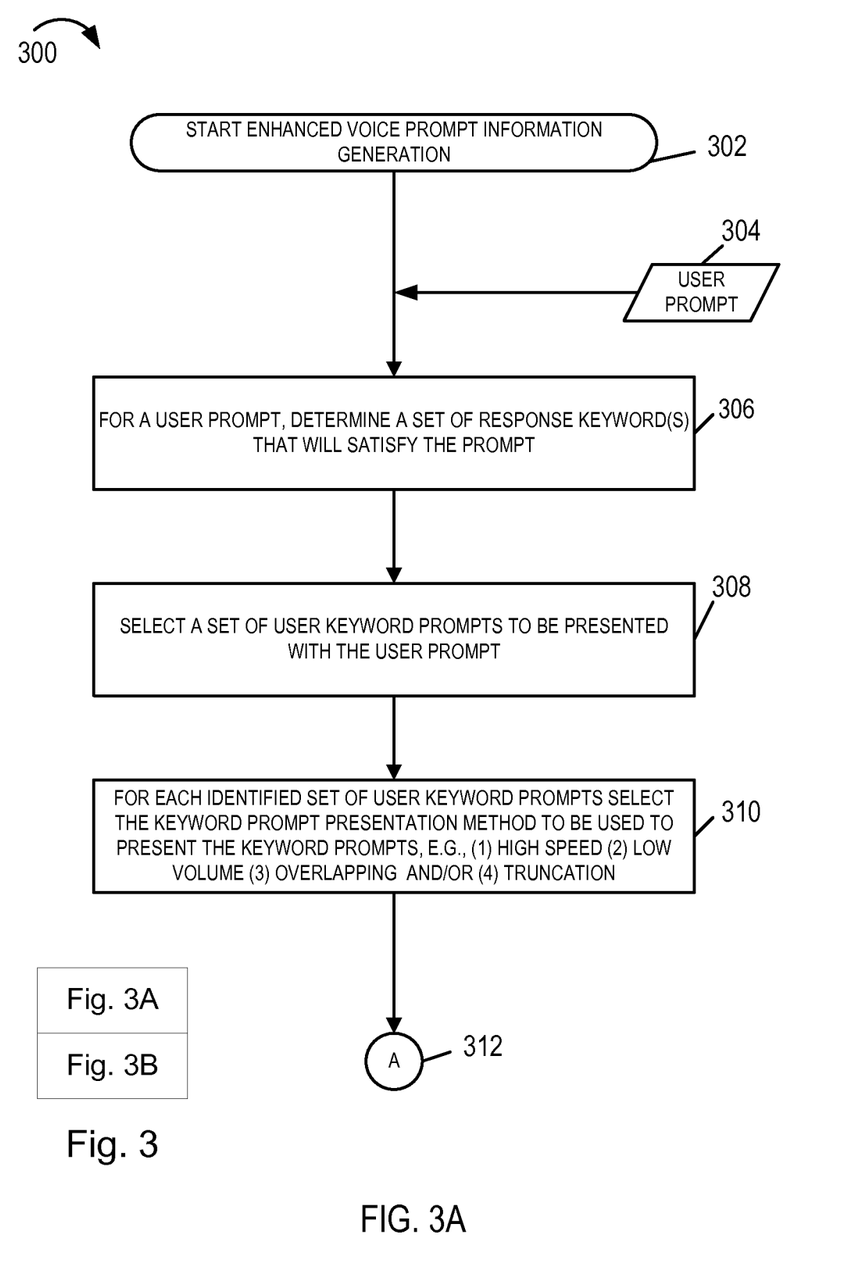
Figure 3B:
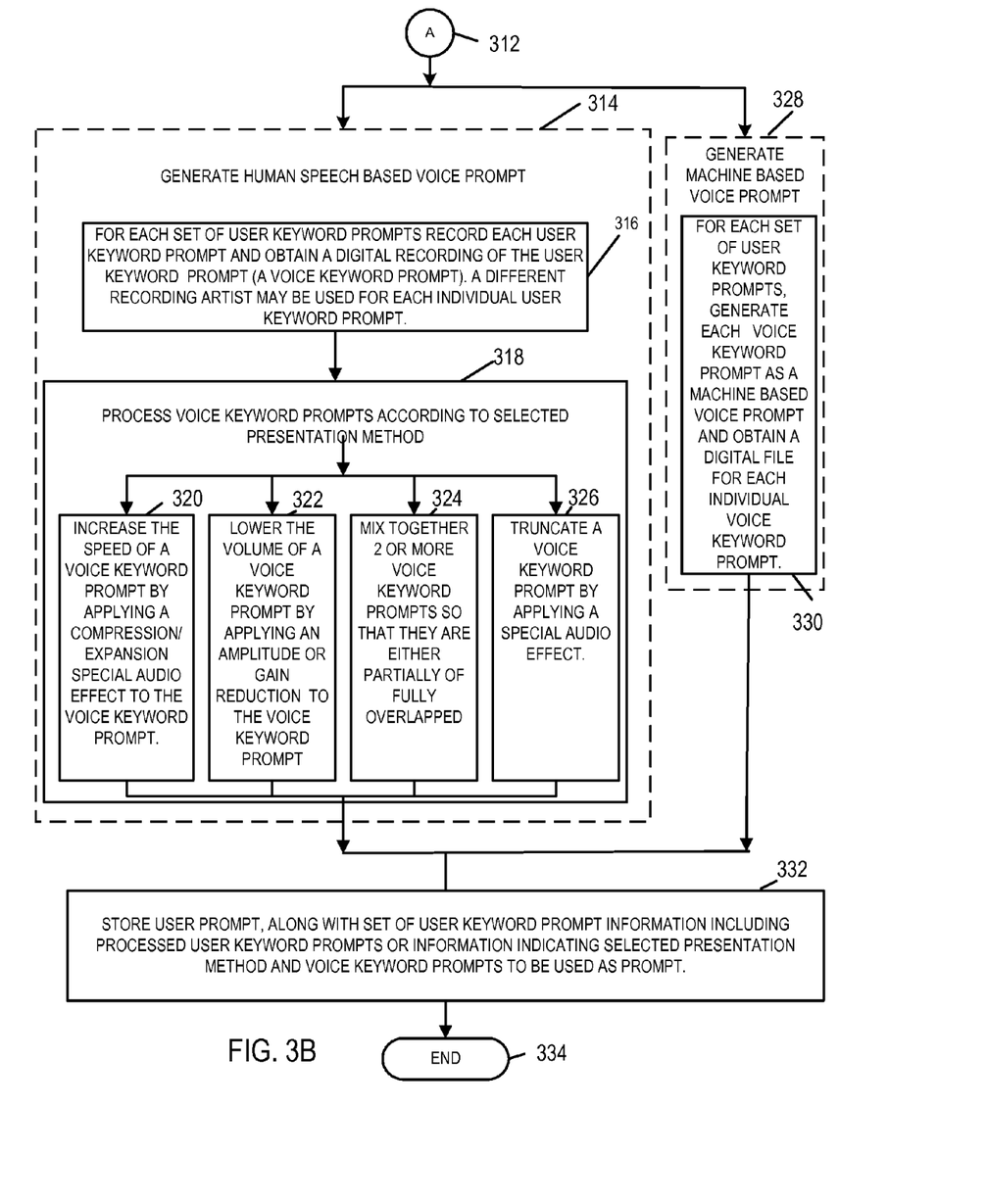

FIG. 3 (a composite of FIGS. 3A and 3B) is a flowchart illustrating an exemplary method of enhanced voice prompt information generation in accordance with the invention. The method of enhanced voice prompt information generation starts with node 302 of FIG. 3A, e.g., when IP/menu generation system 200 is activated. A user prompt 304 is accepted as input. In step 306, a set of response keyword(s) 252 that will satisfy the user prompt 304 are determined. Operation proceeds to step 308, where a set of user keyword prompts 262 are selected. The user keyword prompts 262 are to be presented during use with the user prompt 304 as part of a menu presentation. The user keyword prompts 262 are intended to encourage the user to speak one of the response keywords 252 as a reply to the corresponding user prompt 304. In some embodiments, the user keyword prompts 262 are the response keywords 252. In other embodiments, the user keyword prompts 262 are different words than the response keywords 252 or are truncated portions of the keywords. The user keyword prompts 262 may be specifically selected to: cause a user association, serve as a (subthreshold) stimuli, serve as a phonological cue, and/or generate a particular context which may aid the user in remembering and/or pronouncing a response keyword 252. Operation proceeds from step 308 to step 310. In step 310 for each user keyword prompt in the set of keyword prompts 262, a keyword prompt presentation method is selected. Examples of presentation methods for the user keyword prompts 262 include: (1) high speed (relative to the user prompt), (1) low volume (relative to the user prompt), (3) overlapping between different keyword prompts in the set of user keyword prompts, and/or overlapping the user prompt, and (4) truncation. Other variations on the presentation method may include: use of different voices for different prompts, different volume levels for different individual keyword prompts, and variations in volume levels of individual keyword prompts. Various combinations of the presentation methods are possible for a keyword prompt or set of prompts in accordance with the invention. Some of the user keyword prompts 262 in a set of user keyword prompts (corresponding to a user prompt) may have no special processing or enhancements while others are enhanced. Having completed the selection of user keyword prompts 262 and the method of presentation of the user keyword prompts 262, operation proceeds from step 310 via connecting node A 312 to steps 314 and 328.

Steps 314 and 328 represent the start of alternative prompt generation methods. Two alternative methods are shown depending upon whether the voice keyword prompts 264 shall be based on human speech recordings or shall be based upon machine generated voice. Step 314 corresponds to an exemplary method to generate a voice prompt (a set of voice keyword prompts 264) based on human speech recordings, while step 328 corresponds to an exemplary method used to generate a voice prompt (a set of voice keyword prompts 264) based on machine generated voice models.

Human speech based voice prompt generation step 314 includes step 316 and step 318. In step 316, a human speaks, e.g., pronounces each of the user keyword prompts 262 in a set of user keyword prompts 262. The pronunciations of the human voice are recorded, and a digital recording of each human voice keyword prompt 270 is generated and stored. Different recording artists may be used for each of the user keyword prompts 262 (e.g., male and female recording artists, recording artists of different ages, etc.). Creating a distinction between voices used for different user keyword prompts 262 by using different speakers for different words is used to enable the user to better differentiate between overlapped and/or mixed voice keyword prompts 264 in a presentation. This created distinction of voices may more effectively exploit the previously discussed "cocktail party" effect, and facilitate focusing the user's attention on the keyword prompt of interest.

Operation proceeds from step 316 to step 318. In step 318, the recorded human voice keyword prompts 270 of step 316 are processed in accordance with the presentation method selected for the particular individual keyword prompt in step 310. Four exemplary presentation techniques are included in step 318. In the first presentation technique, used in step 320, the speed of a voice keyword prompt is increased by applying a compression/expansion special audio effect to the voice keyword prompt. In the second presentation technique used in step 322, the volume of a voice keyword prompt is lowered by applying an amplitude or gain reduction to the voice keyword prompt. In the third presentation technique used in step 324, two or more voice keyword prompts in the set of voice keyword prompts are mixed together so that they are either partially of fully overlapped. In the fourth presentation technique, used in step 326, a voice keyword prompt is truncated by applying a special audio effect to the recorded voice keyword prompt. Variations and combinations of these techniques are applied to some or each of the voice keyword prompts in accordance with the invention. For example, each of the voice keyword prompts in the set of voice keyword prompts may be increased in speed to a rate higher than the corresponding user prompt. Each of the voice keyword prompts may processed to be at a different speech rate with respect to the other keyword prompts. Each of the voice keyword prompts may be adjusted in volume level to be lower than the user prompt. Each of the voice keyword prompts may be adjusted in volume level to be different than the level of the other voice keyword prompts. One or more of the voice keyword prompts may be truncated. The voice keyword prompts of a set corresponding to a user prompt may be mixed together so that the total length, e.g., presentation time, of the processed set of voice keyword prompts will be equal to or shorter than the length of the longest individual voice keyword prompt. In addition, the voice keyword prompts of the set may be mixed together such that the amount of overlap between individual voice keyword prompts is minimized or at least kept to some maximum threshold. Steps 320, 322, 324, and/or 326 produce processed (enhanced) keyword prompts 266. Operation proceeds from these steps to step 332.

Machine based voice prompt generation step 328 includes sub-step 330 and describes an exemplary approach of generating a voice prompt (a set of voice keyword prompts 264) based on machine generated voice models. In step 330, each machine voice keyword prompt 272 is generated by a voice synthesizer module. A digital file generated by the synthesizer is output for each individual user keyword prompt 262, although a single file could be generated for multiple keyword prompts, e.g., one per set of keyword prompts corresponding to a user prompt. In this exemplary embodiment, the processing of the machine voice keyword prompts 272 to generated processed (enhanced) keyword prompts 266 in accordance with the invention is performed at a later time, e.g., when the menu is presented to a user. Operation proceeds from step 330 to step 332.

In step 332, the user prompt (input 304 of FIG. 3A) is stored along with a corresponding set of user keyword prompt information 254 including processed keyword prompts 266 or information indicating selected presentation method 268 and voice keyword prompts 264 to be used during prompt presentation. Operation ends at node 334 where sufficient information has been input, selected, generated, and/or stored such that a menu, including a processed (enhanced) voice keyword prompt 266 may be presented to a user at a later time, e.g., when the user places a call and accesses the automated voice system.

Other variations of enhanced voice prompt information generation are possible in accordance with the invention. For example, human voice keyword prompts 270 may be generated and stored but may not be processed into processed (enhanced) keyword prompts 266 until the time of menu presentation to a user. In other embodiments, the machine generated voice prompts 272 may be generated, processed into processed (enhanced) keyword prompts, and stored. Various combinations, e.g., mixtures of human voice keyword prompts 270 and machine voice keyword prompts 272 are also possible in accordance with the invention. Also, some of the keyword processing (enhancements) may be performed and stored during the voice prompt information generation, while other processing may be reserved to be performed during the menu presentation to a user.

Figure 4:
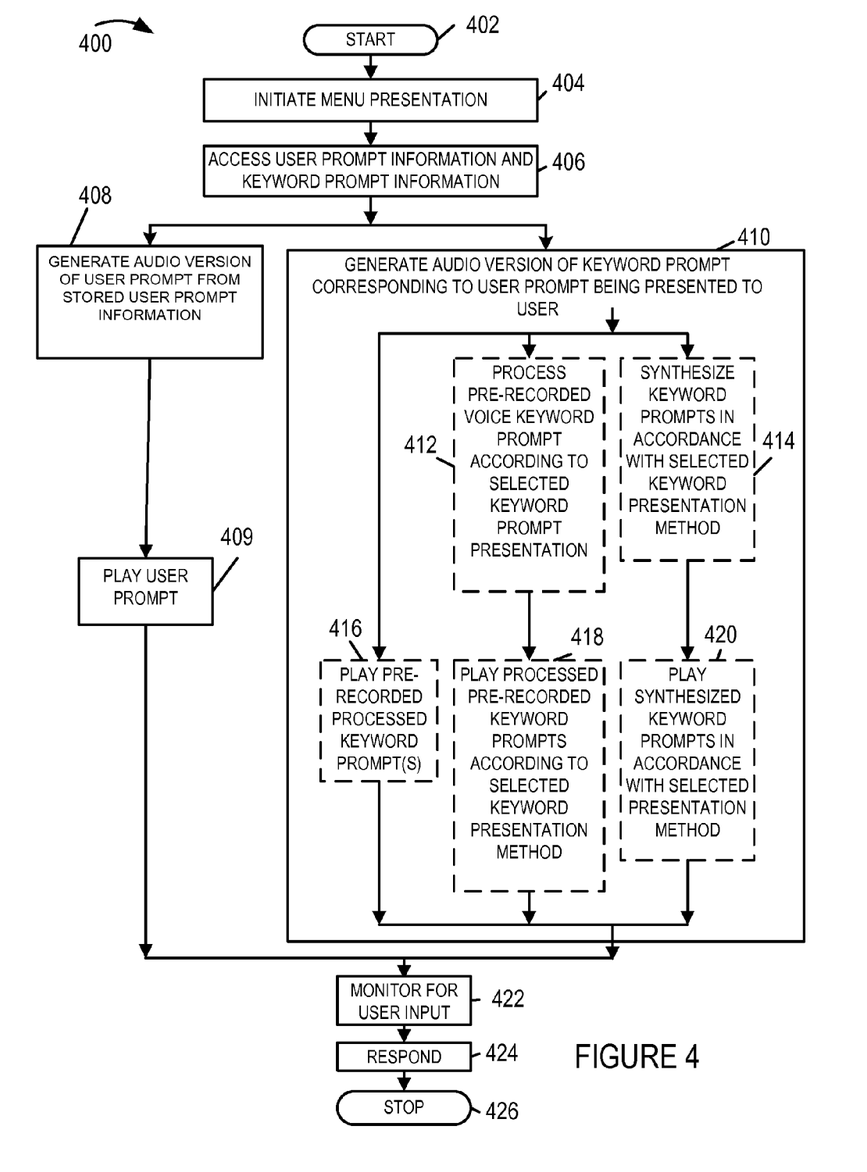
FIG. 4 is a flowchart illustrating an exemplary menu presentation in accordance with the present invention.

FIG. 4 is a flowchart 400 illustrating an exemplary menu presentation method implemented in accordance with the present invention. Operation of the method 400 of the present invention starts at step 402, e.g., IP/menu generation system 200 is activated. In step 404, menu presentation is initiated, e.g., in response to some customer or user action. For example, a call may be placed by a user to an intelligent peripheral including IVR, implemented in accordance with the present invention. Reception of the call triggers the menu presentation. Alternately, if the menu presentation system is part of a stand-alone voice interactive system, e.g., an ATM, an automated vending machine, a self-serve checkout, etc., a sensor, e.g., a switch, a light sensor, a proximity sensor, etc. may be used to detect the presence of a user and may initiate the menu presentation. Voice input and/or signals from a local or remote input may also serve to initiate the presentation. In addition, the menu presentation of the invention may be included as part of a larger menu presentation and may, in some embodiments, be triggered by reaching a specific point or branch in the larger menu.

Operation proceeds from step 404 to step 406, where the user prompt information 250 and the user keyword prompt information 254 are accessed. Such information may have been stored in memory in step 332 of FIG. 3B. In some embodiments, different variations of the user keyword prompt information 254 may be accessed to customize the processed (enhanced) keyword prompts 266 for a specific user(s). For example, in a telephone based system individual users may be identified, e.g., based on the telephone number they are calling from using automatic number identification techniques. Historical data may have been collected on the individual the user's success rate and access rate when previously negotiating the same menu system and stored in memory for future use. Such historical data is used in some embodiments to customize the presentation to attempt to maximize efficiency.

Operation proceeds form step 406 to both step 408 and step 410. In step 408, an audio version of the user prompt is generated from stored user prompt information 250. In step 410, an audio version of the processed (enhanced) keyword prompts is generated corresponding to the user prompt 256 of step 408 which may be performed in parallel or sequentially.

The generation of the audio user prompt in step 408 includes the generation of the processed user prompt 256, a prompt requesting user input. In step 409, the processed user prompt 256 is played to the user. On the phone based system, "playing" may involve the generation and transmission of signals to the user which may be output as audio signals, e.g., speech. On a stand-alone system, "playing" may involve the transmission of signals to an output device 208, e.g., a local speaker which can directly output the audio.

Step 410 includes 3 alternative methods that may be followed to generate the audio version of the processed (enhanced) keyword prompt. One of the methods is used for any given presentation. In the first method, a pre-recorded, previously processed (enhanced) keyword prompt(s) 266 is accessed and played in step 416.

In the second method, voice keyword prompts 264 have been pre-recorded, but have not been processed, e.g., enhanced, for presentation. In step 412, the pre-recorded voice keyword prompts 264 are processed according to the selected keyword prompt presentation to generate processed keyword prompt signals. From step 412, operation proceeds to step 418 where the recently processed (enhanced) keyword prompts are played according to the selected keyword presentation method indicated in info 268. In some embodiments, the keyword processing may be performed and completed in step 412, while in other embodiments some of the keyword processing may be performed in step 412 and some of the keyword processing may be performed in step 418, e.g., where the presentation method includes overlapping a volume control. For example, the truncation, speed up, and volume adjustments to the voice keyword prompts 264 may be performed in step 412 while the mixing or overlapping of voice keyword prompts 264 may be performed in step 418.

In the third presentation method, the user keyword prompts 262 have not been pre-recorded. In step 414, the processed keyword prompts 266 are synthesized in accordance with the selected keyword presentation method in info 268. Operation proceeds to step 420, where the synthesized processed keyword prompts 266 are played in accordance with the selected presentation method in info 268. As was the case with the second method, the keyword processing for presentation may be performed partially or in its entirety by any combination of the two steps 414, 420.

Various keyword prompt processing methods, in accordance with the invention, may be used in steps 412, 418, 414, and 420; those processing (enhancement) methods have been previously described in detail in FIG. 2 (with regards to presentation processing routine 232 and presentation method info 268) and FIG. 3 (step 314 and 328).

The timing of the "playing" of the user prompt 256 of step 408 and the "playing" of the corresponding processed (enhanced) keyword prompts 266 of step 410 may be controlled in accordance with the invention. In general, the user prompt 256 precedes the processed (enhanced) keyword prompts 266, and the user prompt 256 is non-overlapping with respect to the processed (enhanced) keyword prompts 266. However, in some embodiments, the processed (enhanced) keyword prompts 266 may partially or fully overlap the user prompt 256. For example, in applications where a user frequently accesses the same automated voice menu, typically the user will become familiar with the user prompt message and need not listen attentively to the entire user prompt message. In such a case, it may be advantageous to start playing the processed (enhanced) keyword prompts 266 before the playing of the user prompt 256 has completed. Where user and keyword prompts overlap different voices and/or different volume levels are normally used for the user and keyword prompts.

In steps 409 and 410 prompts 256, 266 have been output to the user, e.g., presented to the user in the form of audio. In step 422, the voice interface monitors for user input 258, e.g., a response to the user and keyword prompts. The voice interface is anticipating the pronunciation of response keywords 252 by the user. In some embodiments, the monitoring may continue until a timeout is reached. Next, in step 424, the voice interface responds by processing any speech detected during monitoring step 422. Exemplary responses for the recognition of a response keyword 252 include: proceeding to the next step in the menu, accessing, processing, and/or outputting data, performing a requested action, and transferring to an operator. The next step in the menu may also include another user prompt 256 and another corresponding set of processed (enhanced) keyword prompts 266. Exemplary responses for no response or an incorrectly spoken keyword include: repetition of the user prompt 256 and processed keyword prompts 266, repetition of the user prompt 256 accompanied by the response keywords 252, repetition of the user prompt 256 accompanied by unprocessed user keyword prompts 262, repetition of the user prompt 256 accompanied by differently processed (e.g., no overlapping, increased volume) user keyword prompts, and the transfer to an operator. The menu presentation method is terminated at node 426.

Figure 5:
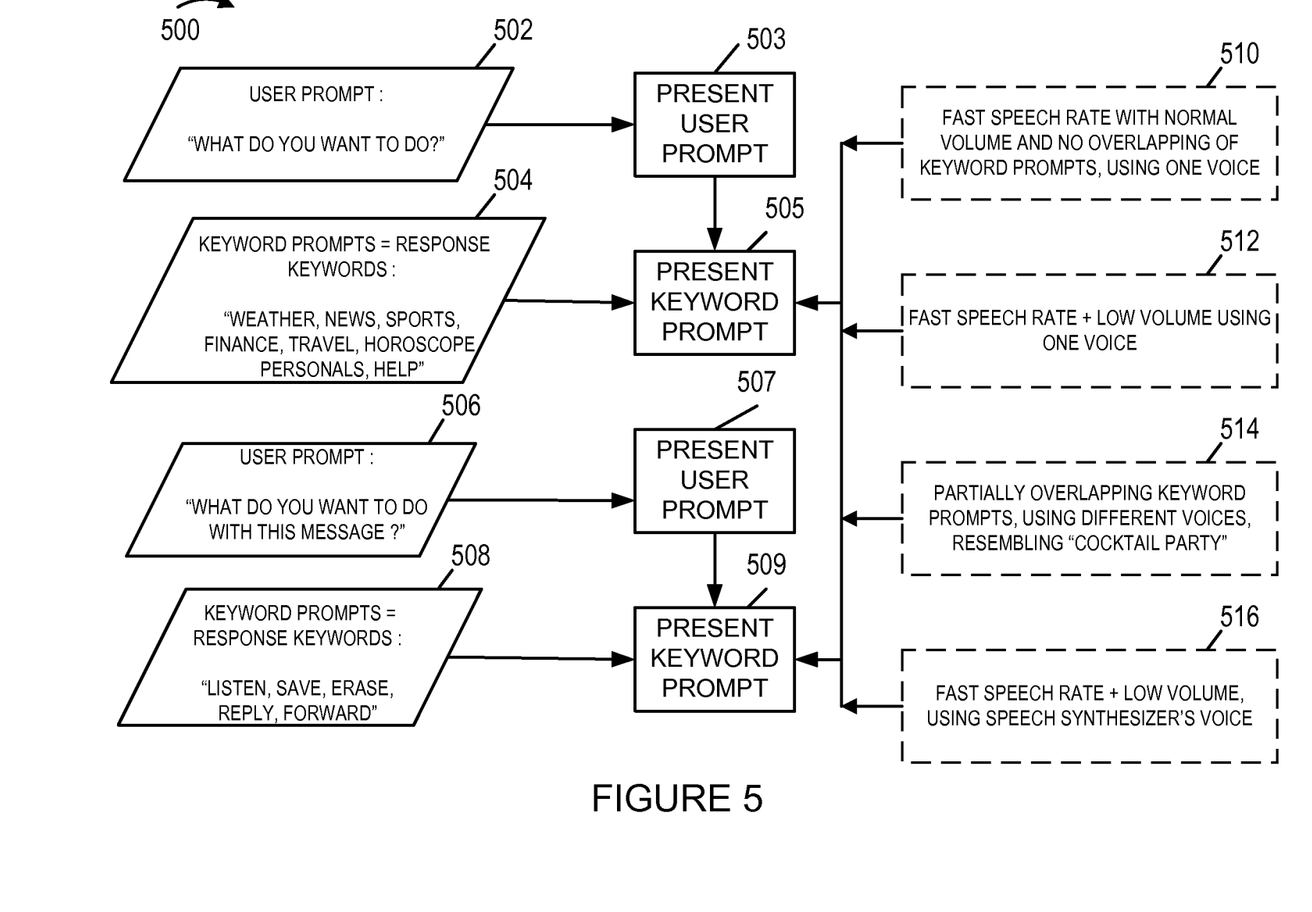
FIG. 5 illustrates two exemplary applications of the present invention and four exemplary presentation methods that may be used in accordance with the present invention.

FIG. 5, drawing 500, illustrates two exemplary applications of the invention. In the first example, the invention is applied to a general information speech interface which may be used, e.g., as part of an information retrieval service, where a user may initiate any one of a plurality of operations including retrieval of weather information, sports information, etc. User prompt 502, "What do you want to do?" is played (presented) to a user in step 503 using, e.g., a first voice and speech rate. In this example, the keyword prompts 504, "weather, news, sports, finance, travel, horoscope, personals, help" are the same as the response keywords and are presented to the user in step 505 following the presentation of user prompt 503. The keywords prompts 504 are processed and played (presented) to a user in step 505 with the processing involving a selected one of the presentation methods 510,

512, 514, 516. In some embodiments step 503 and 505 overlap producing overlapping speech corresponding to the user and keyword prompts. First exemplary processing presentation method 510 is a fast speech rate (with respect to the speech rate of the user prompt), a low volume (with respect to the volume of the user prompt), no overlapping of keyword prompts, and each of the keyword prompts using the same human voice. A second exemplary processing presentation method 512 is a fast speech rate (with respect to the speech rate of the user prompt), a low volume (with respect to the volume level of the user prompt), and the same human voice used for each of the user keyword prompts. A third exemplary processing presentation method 514 is partially overlapping keyword prompts, using different human voices for each of the keyword prompts, resembling a "cocktail party". A fourth exemplary processing presentation method 516 is a fast speech rate (with respect to the rate of the user prompt), a lower volume (with respect to the volume level of the user prompt), and each of the keyword prompts generated using a speech synthesizer's voice.

Prompts 506, 508 and presentation steps 507, 509 correspond to a voice mail interface example. User prompt 506 "What do you want to do with this message?" is played to a user in step 507, e.g., using normal voice and speech rate. In this example, the keyword prompts 508 "listen, save, erase, reply, forward" are the same as the response keywords. The keyword prompts 508 are processed (enhanced) and presented to a user in accordance with the methods of the invention in step 509. Several exemplary keyword prompt processing presentations methods 510, 512, 514, 516 which may be used are shown in FIG. 5 and have been described above. Thus, in the FIG. 5 example user prompts are presented using a first voice, speech rate and volume while the corresponding keyword prompt or prompts are presented using a different voice, speech rate and/or volume and potentially overlapping speech. Keyword prompts are often presented using a faster speech rate than the corresponding user prompt and/or at a lower volume.

Figure 6:
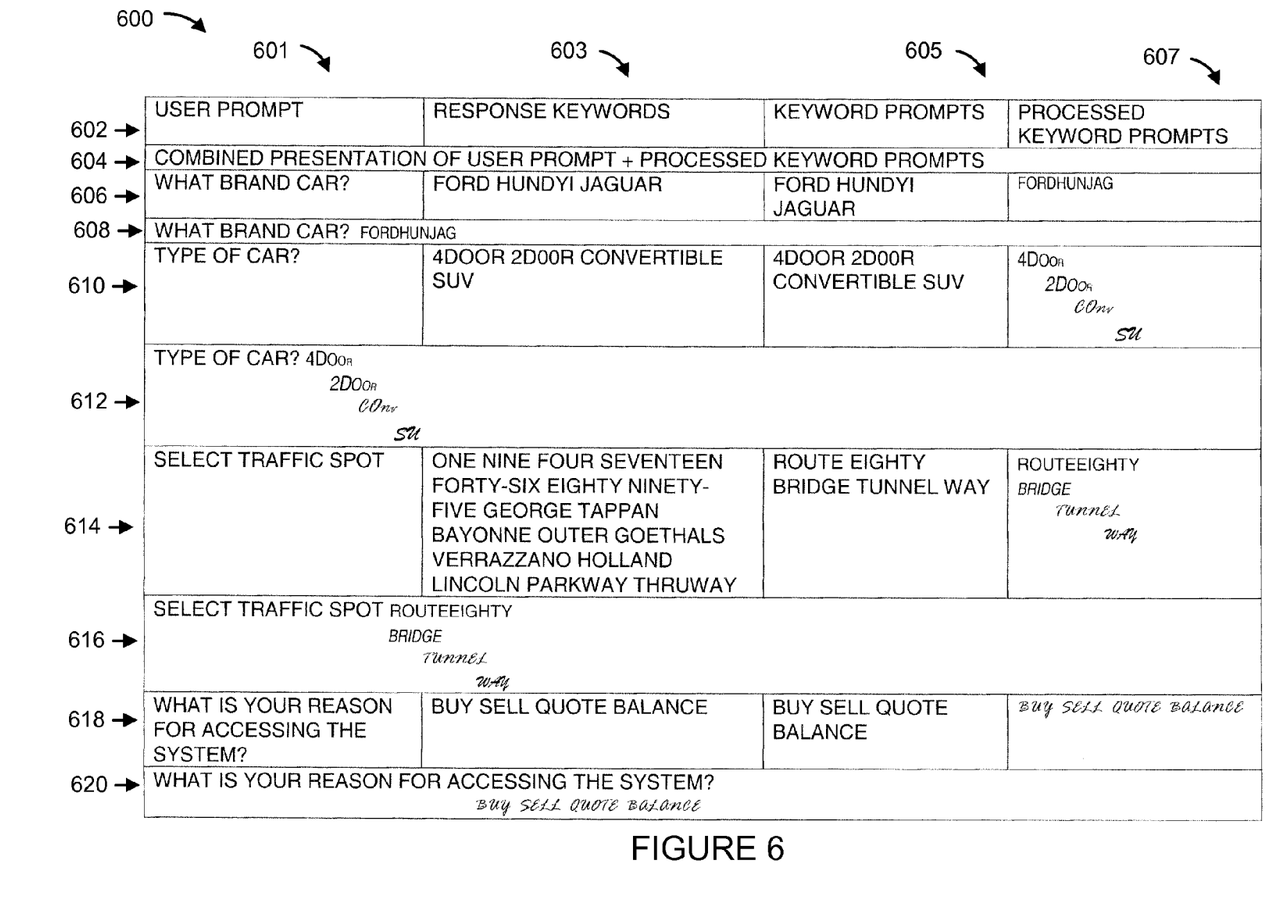
FIG. 6 is a table illustrating four additional examples of menu presentation in accordance with the methods of the present invention.

FIG. 6 shows a table 600 illustrating additional examples of applications of the present invention. The following notation is used for the user prompt and the enhanced keyword prompts in FIG. 6 to illustrate features in accordance with the present invention. The volume level is indicated by the vertical height of the prompt. Variations in volume are indicated by corresponding variations in the height of characters in the prompt. The speed of prompt is indicated by relative compression, i.e., difference in horizontal width, of the characters. Different voices are indicated by the use of different fonts. Overlapping speech is indicated by overlapping words in different rows of the processed keyword prompts box from left to right.

FIG. 6 illustrates multiple sets of prompt information, where each two successive rows corresponds to one set of information. First and second rows 602, 604 describe the information and order of presentation for each subsequent set of information listed in table 600. First row 602 serves as a title row identifying the content of each column in the first row of a set of prompt presentation information. The first column 601 is a user prompt, the second column 603 lists the corresponding response keywords, the third column 605 lists the corresponding keyword prompts, while the fourth column 607 lists processed keyword prompts. Second row 604 indicates that the second row of each set of prompt information lists the combined user prompt and processed (enhanced) keyword prompts with syntax and spacing showing how they are presented in accordance with the invention.

Third and fourth row 606, 608 correspond to an exemplary rental car automated voice interface application and illustrate the use of: truncation, increased speech rate, and decreased volume for the keyword prompt, in accordance with the invention, while the user prompt is presented using ordinary speech.

Fifth and sixth row 610, 612 correspond to another rental car voice interface application and illustrate the use of: different voices, truncation, partial overlap, reduced volume, and volume fading for the keyword prompts, in accordance with the methods of the invention while the user prompt is presented using ordinary speech.

Seventh and eighth row 614, 616 correspond to an automated traffic report voice interface application and illustrate the use of: response keywords which are distinct form keyword prompts, different voices for some keyword prompts, compression, combinations of partial and full overlapping, removal of pauses, and increased speech rate, in accordance with the methods of the invention while the user prompt is presented using ordinary speech.

Ninth and tenth rows 618, 620 correspond to an automated brokerage account voice interface application and illustrate: the use of different voices between the user prompt and the processed keyword prompts, the use of the same voice for each of the keyword prompts, a reduction in volume applied to the keyword prompts, and overlapping between the user prompt and the processed (enhanced) keyword prompts, in accordance with the methods of the invention.

Modules used to implement the present invention may be implemented as software, hardware, or as a combination of software and hardware. Among other things, the present invention is directed to machine readable medium, memory, including machine readable instructions used to control a device such as a processor to implement one or more steps to implement the methods of the present invention.

Numerous variations and embodiments are possible given the large number of user prompt and keyword prompt presentation methods that can be combined in accordance with the various presentation techniques of the present invention.

What is claimed is:

1. A voice interface method comprising:
   operating a device including a processor to generate a user prompt to solicit input from a user, and
   prior to receiving a user response to said user prompt, generating an audible keyword prompt indicating at least some keywords that may be included by a user in a response to said user prompt, the audible keyword prompt including speech that has overlapping words, wherein said overlapping words comprise two or more voice keyword prompts that are mixed together to be at least partially overlapped.

2. The method of claim 1, wherein said user prompt is an audible prompt.

3. The method of claim 1, wherein said audible keyword prompt includes keywords that may be spoken by the user as part of a response to said user prompt.

4. The method of claim 3, further comprising:
   playing said audible keyword prompt to the user;
   monitoring, following said playing of said audible keyword prompt for keywords spoken by the user in response to said user prompt until a time out is reached; and
   responding to keywords spoken by said user which are detected by said monitoring.

5. The method of claim 1, wherein said step of generating an audible keyword prompt includes generating speech that has includes at least one keyword that is not fully pronounced.

6. The method of claim 1, wherein the step of generating an audible keyword prompt includes:
combining speech corresponding to different speakers to form said audible keyword prompt.

7. The method of claim 5, wherein said step of combining speech corresponding to different speakers includes overlapping the speech of different people, the overlapped speech of at least two different people corresponding to different keywords.

8. The method of claim 1, wherein the step of generating an audible keyword prompt includes synthesizing speech.

9. The method of claim 2, wherein
operating a device including a processor to generate an audible user prompt includes presenting speech at a first rate; and
generating an audible keyword prompt includes generating speech at a second rate that is different from said first rate.

10. The method of claim 2, wherein
generating an audible user prompt includes presenting speech at a first volume level; and
generating an audible keyword prompt includes generating speech at a second volume level that is lower than said first volume level.

11. An apparatus comprising:
a processor configured to control said apparatus to:
generate a user prompt to solicit input from a user, and
generate an audible keyword prompt indicating at least some keywords that may be included by a user in a response to said user prompt, the audible keyword prompt including speech that has overlapping words, wherein said overlapping words comprise two or more voice keyword prompts that are mixed together to be at least partially overlapped.

12. The apparatus of claim 11, wherein said user prompt is an audible prompt.

13. The apparatus of claim 12, wherein said audible keyword prompt includes keywords that may be spoken by the user as part of a response to said user prompt.

14. The apparatus of claim 13, further comprising:
an input device configured to receive keywords spoken by the user in response to said user prompt.

15. The apparatus of claim 11, wherein said processor is configured to control said apparatus to include at least one keyword that is not fully pronounced in said audible keyword prompt.

16. The apparatus of claim 11, wherein said processor is configured to control said apparatus to:
combine speech corresponding to different speakers to form said audible keyword prompt.

17. The apparatus of claim 16, wherein said processor is configured, as part of combining speech corresponding to different speakers, to include overlapping speech of different people, the overlapped speech of at least two different people corresponding to different keywords.

18. The apparatus of claim 11,
further comprising a speech synthesizer; and
wherein the processor is configured to control said speech synthesizer to generate said audible keyword prompt.

19. The apparatus of claim 12, where said audible user prompt includes speech, the apparatus further comprising:
an output device configured to output said speech in said audible user prompt at a first rate and to output speech in said audible keyword prompt at a second rate that is different from said first rate.

20. A non-transitory computer readable medium comprising machine executable instructions which, when executed by a processor, cause said processor to:
generate a user prompt to solicit input from a user, and
generate an audible keyword prompt indicating at least some keywords that may be included by a user in a response to said user prompt, the audible keyword prompt including speech that has overlapping words, wherein said overlapping words comprise two or more voice keyword prompts that are mixed together to be at least partially overlapped.

\* \* \* \* \*